US010287023B2

(12) United States Patent
Lin

(10) Patent No.: US 10,287,023 B2
(45) Date of Patent: May 14, 2019

(54) OBJECTS FALLING DECELERATION SYSTEM ACTIVATED BY AIR BUOYANCE

(71) Applicant: Chen-Hsin Lin, New Taipei (TW)

(72) Inventor: Chen-Hsin Lin, New Taipei (TW)

(*) Notice: Subject to any disclaimer, the term of this patent is extended or adjusted under 35 U.S.C. 154(b) by 351 days.

(21) Appl. No.: 15/238,941

(22) Filed: Aug. 17, 2016

(65) Prior Publication Data
US 2017/0050735 A1 Feb. 23, 2017

(30) Foreign Application Priority Data

Aug. 19, 2015 (TW) .............................. 104213327 U

(51) Int. Cl.
B64D 17/62 (2006.01)
B64D 17/80 (2006.01)

(52) U.S. Cl.
CPC ............. B64D 17/62 (2013.01); B64D 17/80 (2013.01)

(58) Field of Classification Search
CPC ................................ B64D 17/62; B64D 17/80
USPC ......................................................... 244/139
See application file for complete search history.

(56) References Cited

U.S. PATENT DOCUMENTS

| 3,097,819 A * | 7/1963 | Raistakka | B64D 25/12 244/139 |
| 3,796,398 A * | 3/1974 | Eilertson | B64D 17/80 244/139 |
| 4,033,528 A * | 7/1977 | Diggs | B64D 17/80 244/139 |
| 4,040,583 A * | 8/1977 | Bihrle, Jr. | B64C 9/00 244/113 |
| 4,113,208 A * | 9/1978 | Manfredi | B64D 17/80 244/139 |
| 4,480,807 A * | 11/1984 | Bowen | B64D 17/80 244/139 |
| 4,648,568 A * | 3/1987 | Phillips | B64C 27/006 244/17.13 |
| 5,020,739 A * | 6/1991 | Vairo | B64C 17/00 244/113 |
| 5,878,979 A * | 3/1999 | Fisher | B64C 31/0285 244/139 |
| 6,164,595 A * | 12/2000 | Williams | B64D 17/80 244/139 |
| 6,199,799 B1 * | 3/2001 | Lai | B64C 27/006 244/139 |
| 6,682,017 B1 * | 1/2004 | Giannakopoulos | B64D 17/80 244/138 R |
| 9,889,941 B1 * | 2/2018 | Erickson | B64D 17/72 |
| 2009/0308979 A1 * | 12/2009 | Nadir | B64C 39/024 244/147 |

(Continued)

Primary Examiner — Christopher P Ellis
(74) Attorney, Agent, or Firm — Rosenberg, Klein & Lee

(57) ABSTRACT

Disclosed is an objects falling deceleration system that is activated by air buoyance and is mountable on an object and includes at least one air buoyance element, at least one activation member, and at least one deceleration device. The at least one activation member is coupled to the at least one air buoyance element. The at least one deceleration device is coupled to the at least one activation member. When the object falls down, air buoyance acts on the at least one air buoyance element to drive the at least one activation member to activate the at least one deceleration device. As such, through air buoyance activating the at least one deceleration device, an effect of reducing the falling speed of the object can be achieved.

5 Claims, 9 Drawing Sheets

(56) References Cited

U.S. PATENT DOCUMENTS

| | | | |
|---|---|---|---|
| 2013/0175398 A1* | 7/2013 | Chia | B64D 25/12 |
| | | | 244/139 |
| 2015/0314881 A1* | 11/2015 | Tsaliah | B64D 17/72 |
| | | | 244/146 |
| 2016/0318615 A1* | 11/2016 | Pick | B64C 39/024 |
| 2017/0225792 A1* | 8/2017 | Wang | B64D 17/70 |
| 2018/0118353 A1* | 5/2018 | Vander Lind | B64D 17/343 |
| 2018/0244394 A1* | 8/2018 | Lee | B64C 39/02 |

* cited by examiner

OBJECTS FALLING DECELERATION SYSTEM ACTIVATED BY AIR BUOYANCE

FIELD OF THE INVENTION

The present invention relates to an objects deceleration system, and in particular to a deceleration system for falling objects.

BACKGROUND OF THE INVENTION

A number of objects, once falling without any protection measures, may cause undesired damage to the objects. For example, when the glider that a user is flying with malfunctions or breaks down, the user may die without any protection device. In addition, for another example, emergency escape systems that are available for high buildings are generally escape sling based slowly descending devices. However, in a fire where the building may be full of heavy smokes or in an earthquake where the building is broken down and falls, the conventional slowly descending devices may not work.

Thus, in view of the above-discussed reasons, it is urgently desired to have an objects falling deceleration system to help alleviate the problems.

SUMMARY OF THE INVENTION

In view of the above problems, the primary object of the present invention is to provide an objects falling deceleration system that is activated by air buoyance and is mountable to an object and comprises at least one air buoyance element, at least one activation member, and at least one deceleration device. The at least one activation member is coupled to the at least one air buoyance element. The at least one deceleration device is coupled to the at least one activation member. When the object falls down, air buoyance acts on the at least one air buoyance element to drive the at least one activation member to activate the at least one deceleration device.

The objects falling deceleration system activated by air buoyance according to the present invention is applicable to various types of objects and is operable through air buoyance acting on the air buoyance element to drive the activation member to activate the deceleration device for decelerating or reducing the falling speed of the object so as to reduce damage to the object wherein when the weight of the object is greater than the weight of the air buoyance element, air buoyance helps quickly activate the air buoyance element to more quickly activate the deceleration device. The deceleration device comprises all sorts of configuration/structure for achieving the purpose of deceleration or reduction of speed to provide a more efficient and better effect of reducing the falling speed of an object. Further, when the objects falling deceleration system activated by air buoyance according to the present invention is installed on a flying objects, it helps ensures the safety of a user when the flying objects falls down.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
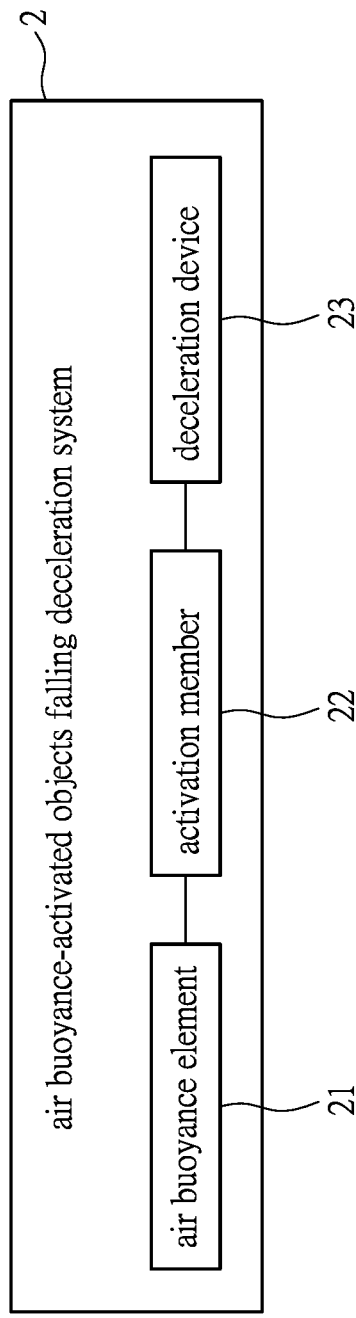
FIG. 1 is respectively a schematic view showing an objects falling deceleration system activated by air buoyance according to the present invention.

Embodiments of the present invention will be described in detail as follows. However, besides what will be described, the present invention is widely applicable to other embodiments and the scope of the present invention is not intended to be limited by the embodiments illustrated and is only determined by the appended claims. Further, for better description and easy understanding of the present invention, parts and components of the present invention may not be drawn to scale in the drawings and some irrelevant details may be omitted for simplifying the illustration of the drawings.

Referring to FIG. 1 is respectively a schematic view showing an objects falling deceleration system activated by air buoyance according to the present invention, which will be referred to as an "air buoyance-activated objects falling deceleration system" for simplicity, the present invention provides an air buoyance-activated objects falling deceleration system 2, which is installable on an object and comprises at least one air buoyance element 21, at least one activation member 22, and at least one deceleration device 23. The at least one activation member 22 is coupled to the at least one air buoyance element 21 and the at least one deceleration device 23. When the object falls, air buoyance or air flotation power is induced on the at least one air buoyance element 21 to make it drive the at least one activation member 22 to activate the at least one deceleration device 23.

Figure 2A:
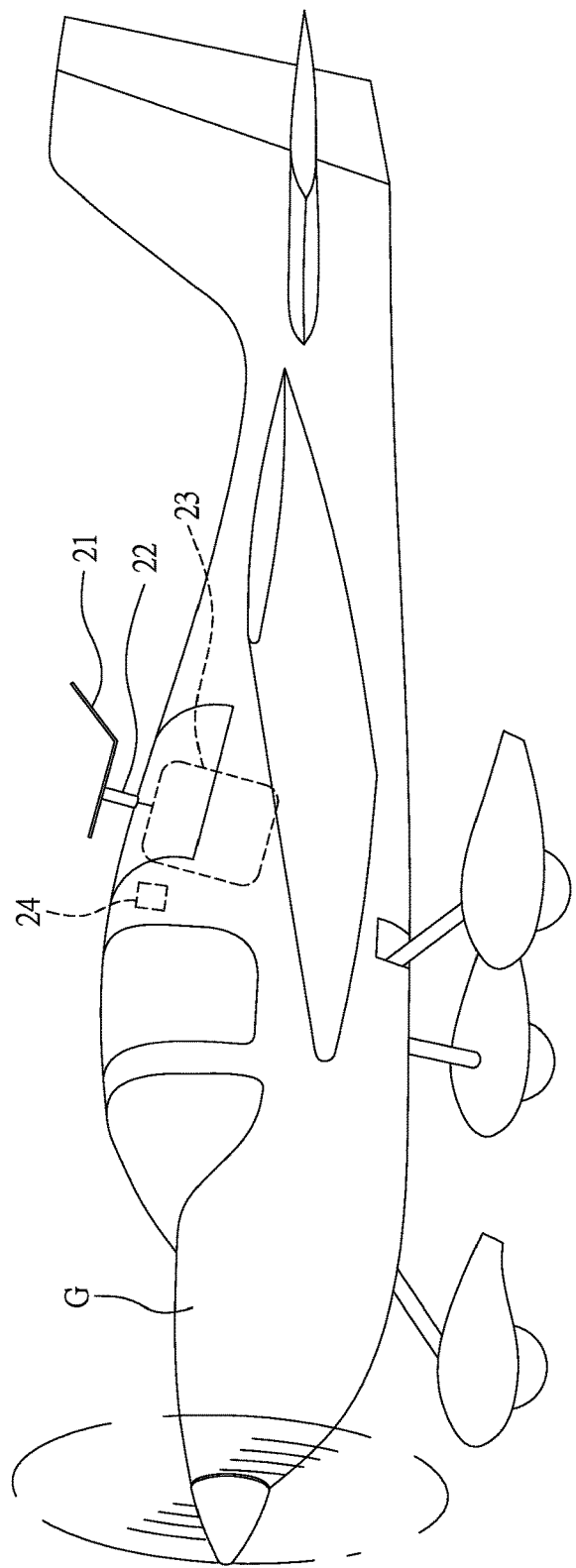
FIGS. 2A and 2B are schematic views illustrating a first example of another objects falling decoration system activated by air buoyance according to the present invention.
Figure 2B:
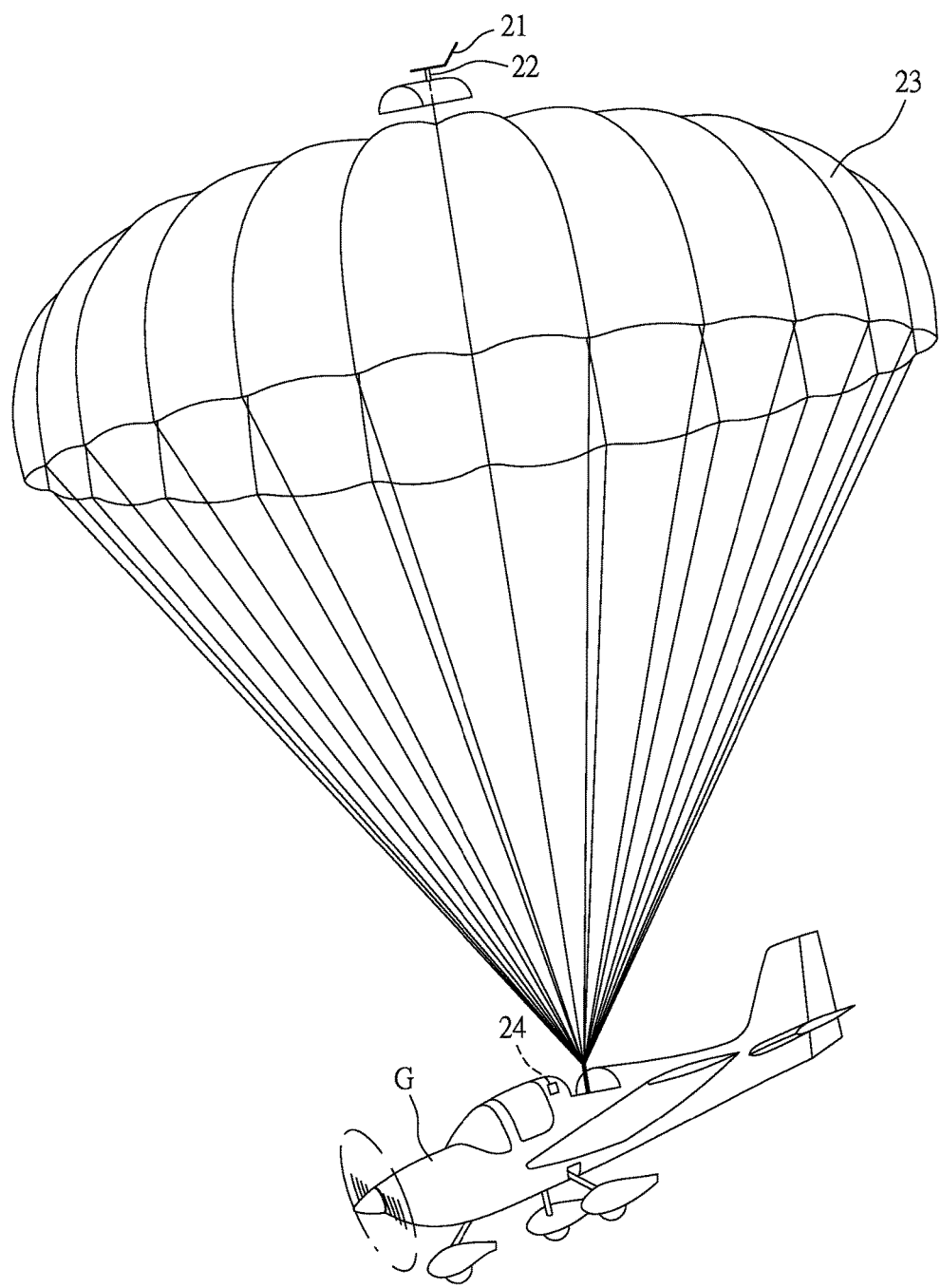

Referring to FIGS. 2A and 2B, a first example of air buoyance-activated objects falling deceleration system according to the present invention is illustrated. The embodiment comprises at least one deceleration device 23 that is arranged inside the object G so that when at least one air buoyance element 21 is acted upon by air buoyance, at least one activation member 22 is driven to activate the at least one deceleration device 23. As such, an effect of reducing the falling speed of the object G can be achieved.

The buoyance-activated objects falling deceleration system 2 comprises the air buoyance element 21, the deceleration device 23, and the activation member 22. The activation member 22 couples between the deceleration device 23 and the air buoyance element 21. In the instant embodiment, the buoyance-activated objects falling deceleration system 2 of the present invention is applicable to an object G that may comprise a glider, a hot-air balloon, a paraglider, a parachute, a helicopter, an aircraft, or a flight vehicle or received in a container or a backpack. Further, such object G may get falling down due to losing power or improper operation during the flight thereof and with the air buoyance-activated objects falling deceleration system 2 of the present invention so installed in such object G, an effect of reducing the falling speed of the object G can be achieved to better protect the safety of the user.

Following the above description, in an embodiment of the present invention, the activation member 22 comprises at least one pin connection piece that can be one of at least one pin, at least one hook, or at least one fastening cable. The deceleration device 23 comprises at least one parachute. The air buoyance element 21 comprises at least one turbulence board. The turbulence board and parachute are connected to each other by the pin or hook. The parachute can be arranged inside the object G and is coupled to the object G by a plurality of fastening cable or a plurality of hooks. Further, the turbulence board may be of different shapes and inclination angles according to different types of object G to which the invention is applied in order to facilitate removal of the pin or hook by means of air buoyance for opening the parachute arranged inside the objects.

In the embodiment of aircraft shown in FIGS. 2A and 2B, the turbulence board can be arranged to have an inclination angle that is inclined with respect to the horizon according to the flying condition of the aircraft. Specifically, when the aircraft is flying forward in a normal condition, air flow passes through the turbulence board along the inclination angle and thus, the deceleration device is kept in an un-activated condition. When the aircraft unexpectedly malfunctions or gets stalling and thus falls down, air buoyance or air flotation power that acts on the turbulence board in a direction from the lower side toward the upper side would force the turbulence board to disengage from the pin to allow parachute to be retrieved. As such, due to the parachute, the falling speed of the aircraft can be reduced to thereby reduce damage and casualty to the aircraft and passengers.

In the above description, to more quickly and more accurately activate the air buoyance-activated objects falling deceleration system 2 of the present invention when an object falls, the present invention may further comprises a sensor 24, which detects the falling speed of the object G. More specifically, when the falling speed of the object G is greater than a predetermined velocity threshold determined by the sensor 24, the sensor 24 activates the deceleration device 23 to reduce the falling speed of the object G.

Figure 3A:
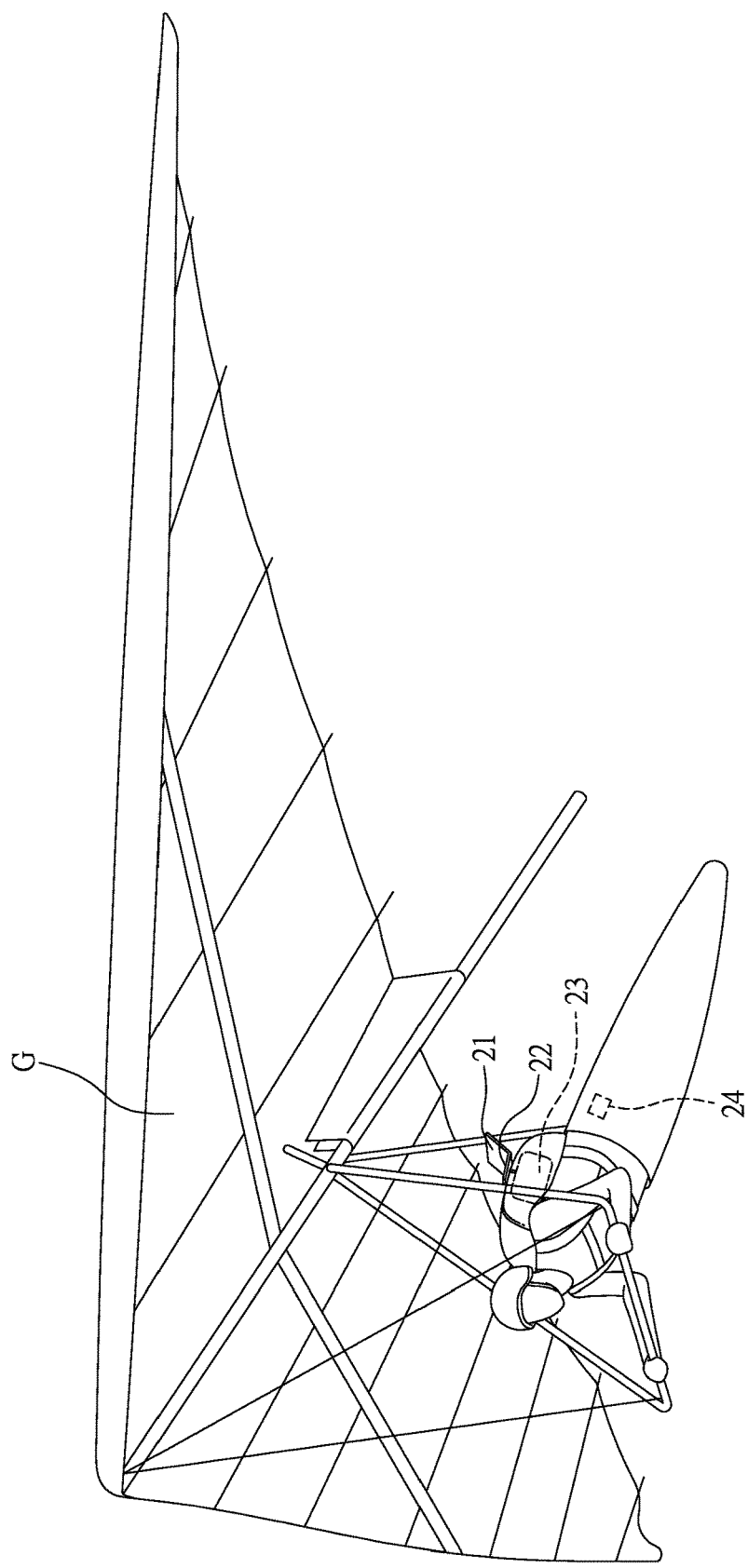
FIGS. 3A and 3B are schematic views illustrating a second example of another objects falling decoration system activated by air buoyance according to the present invention.
Figure 3B:
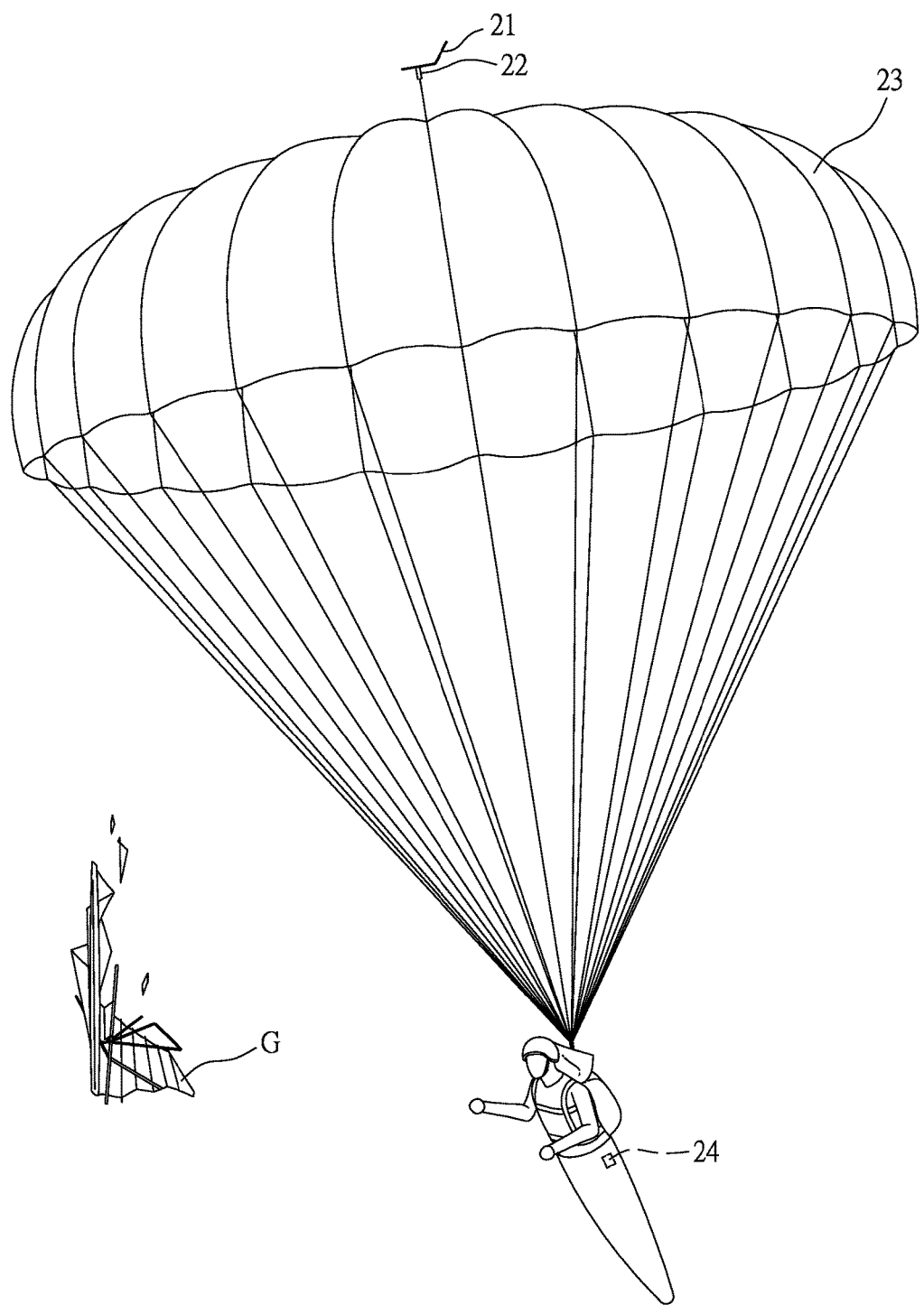

Referring to FIGS. 3A and 3B, a second example of the air buoyance-activated objects falling deceleration system according to the present invention is shown. In the instant embodiment, the air buoyance-activated objects falling deceleration system 2 is applied to an object G that is a glide. Similarly, when the glider that a user is flying with malfunctions or breaks down, as shown in FIG. 3B, the user may immediately jump off the glider to activate or trigger the objects falling deceleration system, wherein the process and operation of activation is similar to that descried above so that repeated description will be omitted. Further, the sensor 24 mentioned above is equally applicable to the body of the user to detect the speed of the user in order to activate the deceleration device when the user falls down.

Figure 4A:
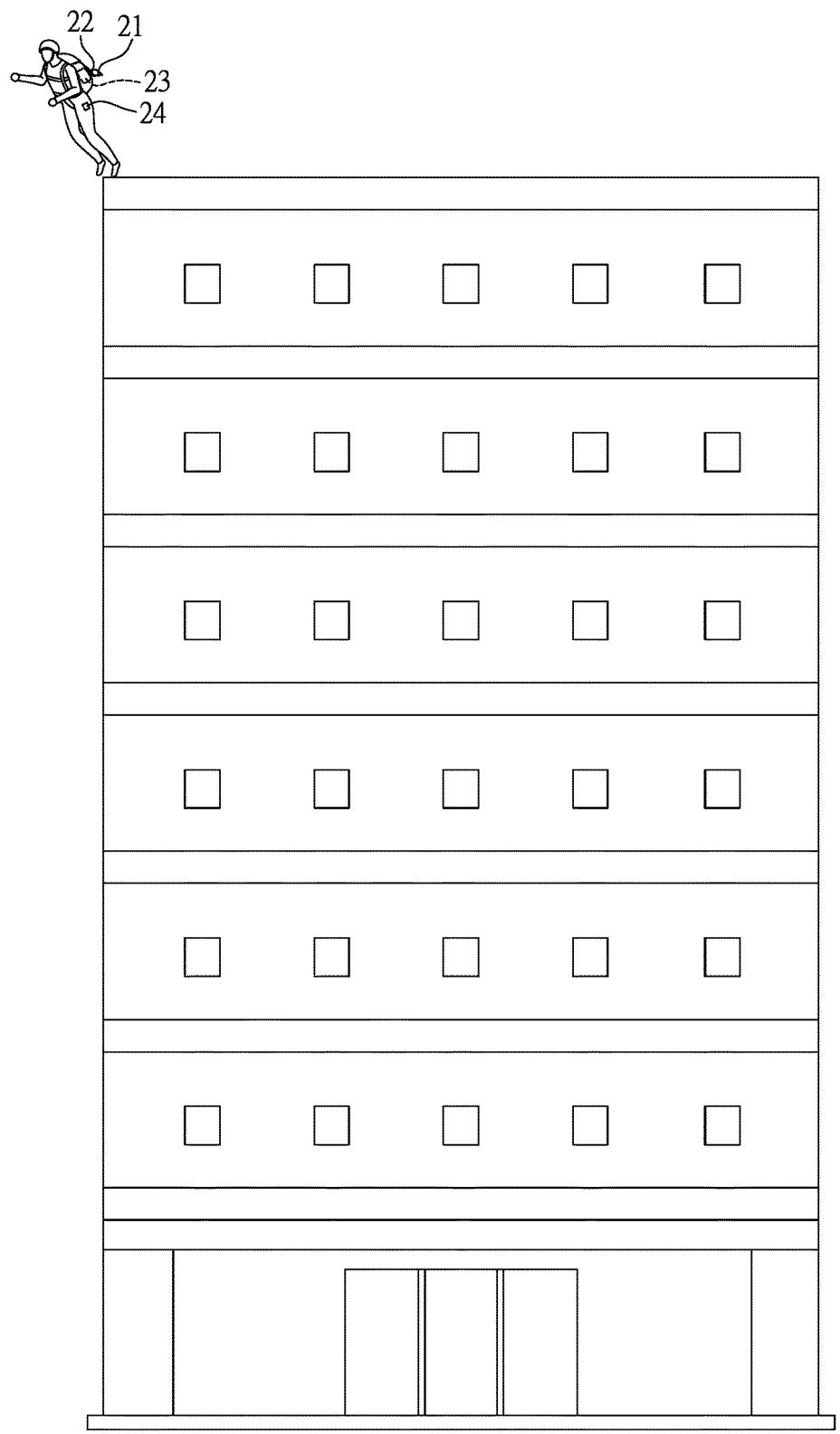
FIGS. 4A and 4B are schematic views illustrating a third example of another objects falling decoration system activated by air buoyance according to the present invention.
Figure 4B:
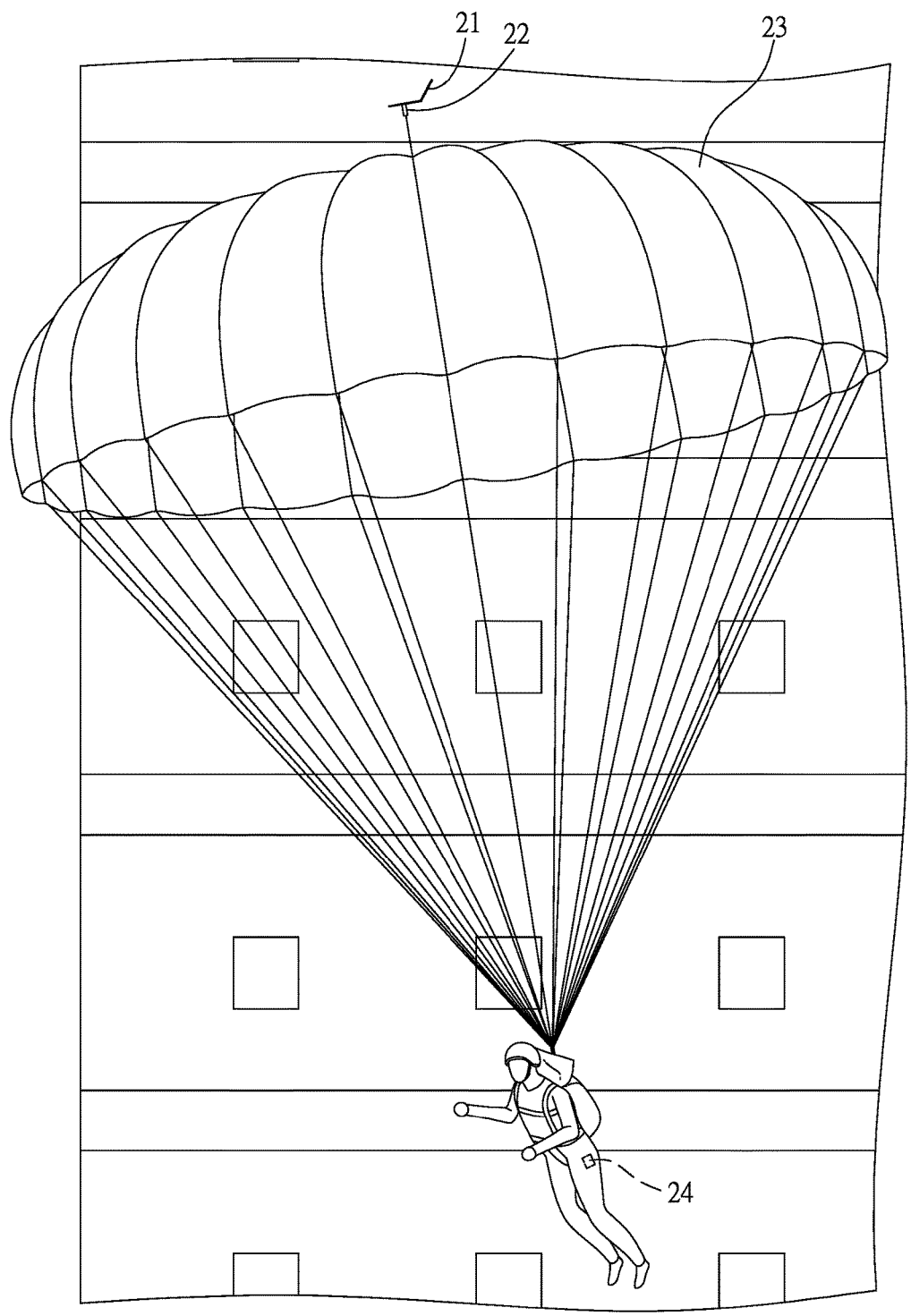

Referring to FIGS. 4A and 4B, a third example of the air buoyance-activated objects falling deceleration system according to the present invention is shown. In the instant embodiment, the air buoyance-activated objects falling deceleration system 2 is used for escape from a skyscraper or a high building. Heretofore, emergency escape systems that are available for high buildings are generally escape sling based slowly descending devices. However, in a fire where the building may be full of heavy smokes or in an earthquake where the building is broken down and falls, the conventional slowly descending devices may not work. The air buoyance-activated objects falling deceleration system 2 of the present invention can be provided inside a high building to serve as an escape device. As shown in FIG. 4A, a user only needs to carry a container in which the air buoyance-activated objects falling deceleration system 2 of the present invention is installed on his or her back and then jumps out of a window of the building or jump out from the top of the building. When the user jumps out of the building, air buoyance or air flotation power may activate the air buoyance-activated objects falling deceleration system 2, as shown in FIG. 4B, and the operation is similar to those described above and will not be repeated here.

Figure 5A:
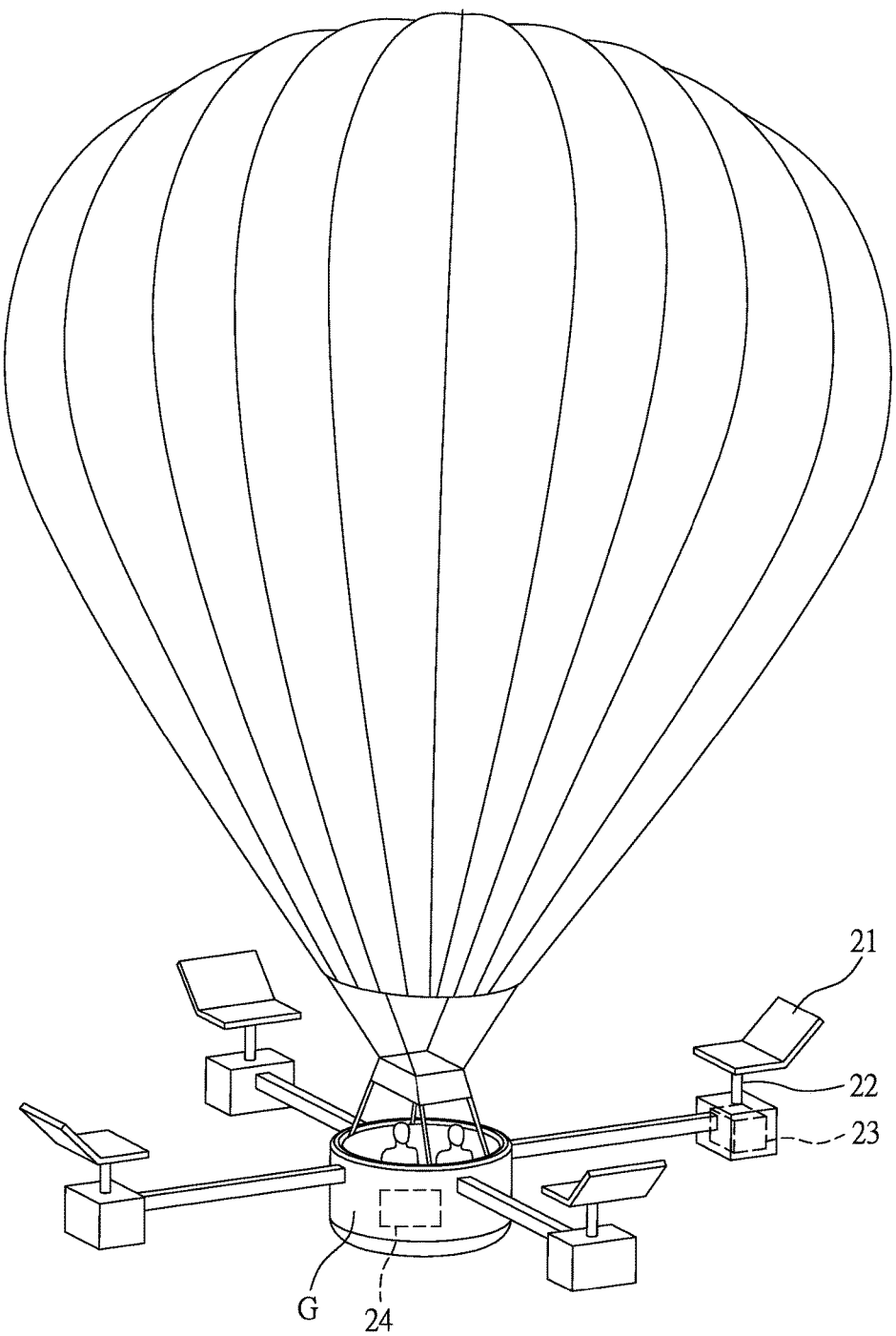
FIGS. 5A and 5B are schematic views illustrating a fourth example of another objects falling decoration system activated by air buoyance according to the present invention.
Figure 5B:
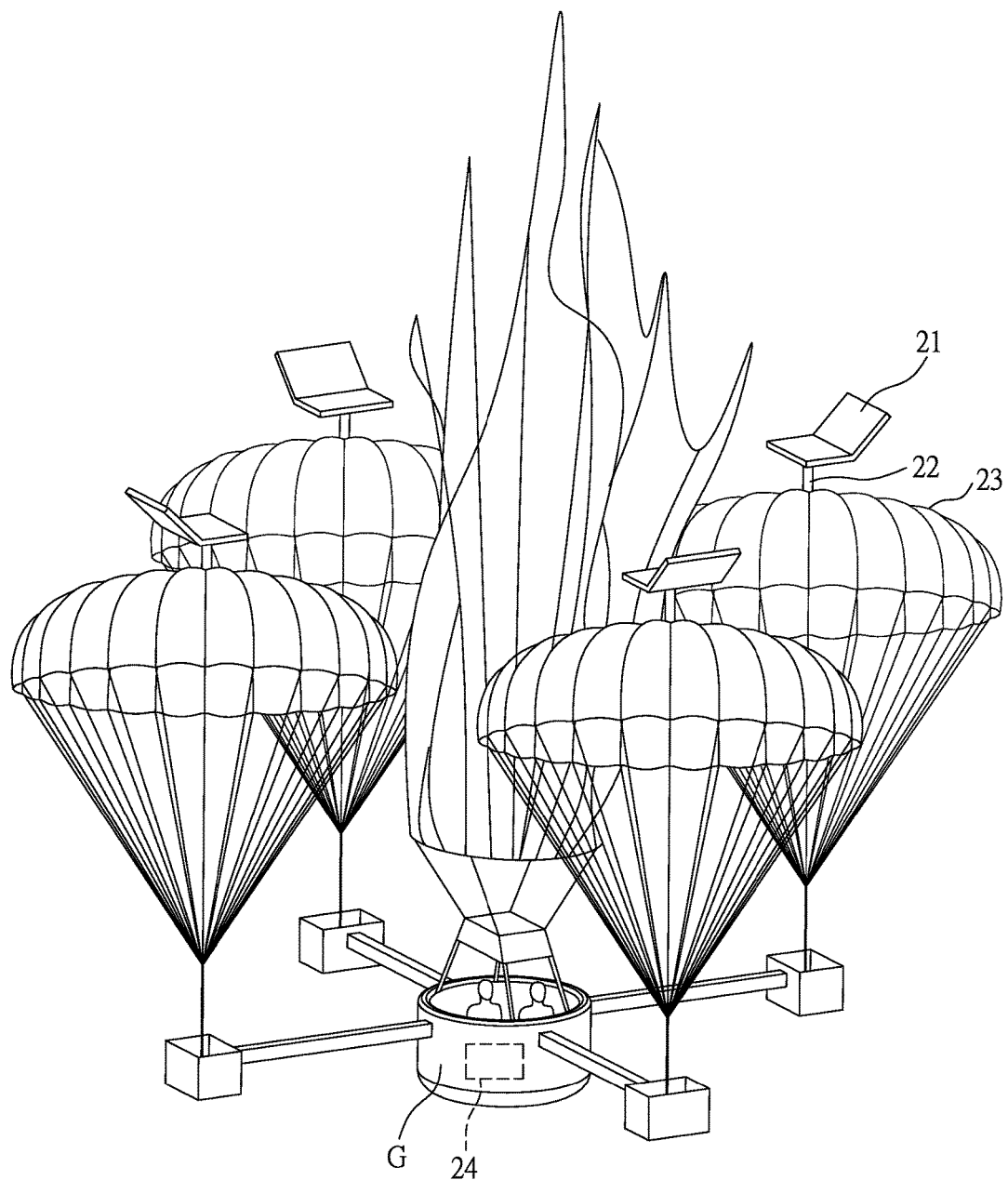

Referring to FIGS. 5A and 5B, a fourth example of the air buoyance-activated objects falling deceleration system according to the present invention is shown. In the instant embodiment, the air buoyance-activated objects falling deceleration system 2 is applied to an object G that is a hot-air balloon. Similarly, when the hot-air balloon catch on fire or is malfunctioned and the basket carrying people is falling, as shown in FIG. 5B, the objects falling deceleration system is activated, wherein the process and operation of activation is similar to that described above so that repeated description will be omitted. Further, the sensor 24 mentioned above is equally applicable to the basket of the hot-air balloon to detect the speed of the basket in order to activate the deceleration device when the basket falls down.

In summary, the present invention provides an air buoyance-activated objects falling deceleration system, which is applicable to all sorts of object and is operable through air buoyance or air flotation power acting on an air buoyance element to drive an activation member for activating a deceleration device to reduce a falling speed of the object thereby reducing damage to the object wherein when the weight of the object is greater than the weight of the air buoyance element, air buoyance or air flotation power helps quickly activate the air buoyance element to more quickly activate the deceleration device. The deceleration device comprises all sorts of configuration/structure for achieving the purpose of deceleration or reduction of speed to provide a more efficient and better effect of reducing the falling speed of an object. Further, when the air buoyance-activated objects falling deceleration system of the present invention is installed on a flying object, it helps ensures the safety of a user when the flying object falls down.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An air buoyance-activated objects falling deceleration system, adapted to be installed on an object, comprising:
   at least one air buoyance element, the at least one air buoyance element including at least one turbulence board;
   at least one activation member coupled to the at least one air buoyance element, the at least one activation member including at least one hook or at least one connection piece; and
   at least one deceleration device coupled to the at least one activation member, the at least one deceleration device comprises at least one parachute arranged inside the object, the object being connected to the parachute through a plurality of fastening cables or a plurality of hooks;

wherein when the object falls, air buoyance acting upon the at least one air buoyance element causes the at least one activation member to activate the at least one deceleration device.

2. The air buoyance-activated objects falling deceleration system as claimed in claim 1, wherein the object comprises at least one of a container, a glider, a hot-air balloon, a paraglider, a parachute, a helicopter, an aircraft, and a flight vehicle.

3. The air buoyance-activated objects falling deceleration system as claimed in claim 1, wherein the object has a weight that is greater than a weight of the at least one air buoyance element.

4. The air buoyance-activated objects falling deceleration system as claimed in claim 1 further comprising a sensor to detect a falling speed of the object.

5. The air buoyance-activated objects falling deceleration system as claimed in claim 4, wherein when the falling speed of the object is greater than a predetermined threshold speed of the sensor, the sensor activates the deceleration device.

\* \* \* \* \*